Patented Nov. 15, 1949

2,487,777

UNITED STATES PATENT OFFICE 2,487,777

MANUFACTURE OF 1-NAPHTHYL METHYL KETONE

George Baddeley, Gatley, England, assignor to Imperial Chemical Industries Limited, London, England, a British company No Drawing. Application April 16, 1946, Serial No. 662,614. In Great Britain May 10, 1945

2 Claims. (Cl. 260—592)

The present invention relates to the manufacture of naphthyl ketones and in particular it relates to the manufacture of alkyl and aryl 1-naphthyl ketones free or almost free from the isomeric 2-naphthyl ketones.

In the reaction between acyl chlorides and naphthalene in the presence of Friedel-Crafts reagents when carried out by the methods which have hitherto been described, mixtures of the $\alpha$- and $\beta$-naphthyl ketones are invariably produced. Thus for example in the reaction between naphthalene and acetyl chloride in nitrobenzene and in the presence of aluminium chloride at 35° C. a mixture of ketones is obtained which contains about 65% of $\beta$-naphthyl methyl ketone and about 35% of $\alpha$-naphthyl methyl ketone.

Pure $\alpha$-naphthyl ketones which are to be used as dyestuff intermediates cannot readily be separated from these mixtures. It is an object of this invention to make substantially pure $\alpha$-naphthyl ketones from naphthalene and methyl naphthalenes without the simultaneous formation of appreciable quantities of $\beta$-naphthyl ketones.

It is known that in the preparation of ketones from aromatic hydrocarbons and acyl chlorides by the Friedel-Crafts reaction, the acyl chloride may be first treated with the Friedel-Crafts reagent to form a complex which is then caused to react with the aromatic hydrocarbon. It has not however hitherto been proposed to use such preformed complexes with aromatic hydrocarbons in the presence of solvents of the chloro- or bromo-paraffin series and it was not to be expected that this would lead to unusual and valuable results.

We have now found that when such preformed complexes are caused to react with naphthalene or methylnaphthalene in the presence of certain selected chloro- or bromo-paraffins, substantially pure $\alpha$-naphthyl ketones are obtained.

According to the invention therefore alkyl and aryl 1-naphthyl ketones are made by a process which comprises interaction of a separately made complex compound of a Friedel-Crafts reagent and a carboxylic acid halide or anhydride with naphthalene or $\alpha$- or $\beta$-methyl derivatives of naphthalene characterised in that the interaction takes place in a liquid medium which is a chloro- or bromo-paraffin of specific inductive capacity at 20° C. not less than 5 nor more than 12.

As said the complex compound of the Friedel-Crafts reagent is separately made. It is important that there be not present carboxylic acid halide or anhydride during the interaction of the Friedel-Crafts reagent with naphthalene. Thus it is no part of the invention to form the Friedel-Crafts reagent in presence of naphthalene. Further in order to ensure the absence of carboxylic acid halide or anhydride during the interaction of the Friedel-Crafts reagent with naphthalene it is preferred in making the Friedel-Crafts reagent to use an excess of the metal halide that is to say more than one molecular proportion thereof per molecular proportion of carboxylic acid halide or more than two molecular proportions thereof per molecular proportion of carboxylic acid anhydride.

Provided these conditions be observed it is not necessary to isolate the Friedel-Crafts reagent. The said reagent may be formed by reaction in for example a chloro- or bromo-paraffin or aromatic hydrocarbon and the solution obtained may be used for the reaction with naphthalene.

As Friedel-Crafts reagents there may be used for example aluminium chloride, aluminium bromide, and ferric chloride.

As carboxylic acid halides there may be used for example acetyl chloride, benzoyl chloride, $\beta$-naphthoyl chloride and lauryl chloride.

As carboxylic acid anhydrides there may be used for example acetic anhydride.

As chloro- or bromo-paraffin of specific inductive capacity at 20° C. not less than 5 or more than 12 there may be used for example dichloromethane, chloroform, bromoethane, 1:1-dichloroethane, 1:2-dichloroethane, 1:2-dibromoethane, but of course for technical purposes the cost of the solvents comes into consideration so that although the compounds mentioned are by physicochemical nature equal in behaviour, it is those which are technical commodities which are to be preferred.

The invention is illustrated but not limited by the following examples in which the parts are by weight.

Example 1

8 parts of acetyl chloride and 14 parts of aluminium chloride are added to 38 parts of ethylene dichloride and the mixture is stirred until the aluminium chloride is dissolved. The solution is then added to a solution of 13 parts of naphthalene in 38 parts of ethylene dichloride, stirred at 35° C. and the mixture is stirred until no more solid separates. It is then poured into dilute hydrochloric acid and the oily layer is separated, washed with water and distilled. 16 parts of methyl-1-naphthyl ketone of B. P. 163° C./15 mm., M. P. 9–10° C. are obtained.

Example 2

A solution of 128 parts of naphthalene in 250 parts of ethylene dichloride is added to a solution at 35° C. of 140 parts of aluminium chloride and 140 parts of benzoyl chloride in 250 parts of ethylene dichloride. The mixture is poured into dilute hydrochloric acid and the oily layer is removed and distilled. There is thus obtained 200 parts of phenyl 1-naphthyl ketone, B. P. 225° C./15 mm., M. P. 73° C. containing not more than 4% of impurities.

Example 3

56 parts of aluminium chloride, 126 parts of ethylene dichloride and 20.4 parts of acetic anhydride are stirred at room temperature for half an hour. A solution of 25.6 parts of naphthalene in 73 parts of ethylene dichloride is added gradually. The temperature is then raised to 50° C. and the mixture is then treated as described in Example 1. 20 parts of pure methyl 1-naphthyl ketone, M. P. 9° C. are obtained.

Example 4

10 parts of β-naphthoyl chloride are dissolved in 32 parts of ethylene dichloride and the solution is added to a suspension of 12 parts aluminium chloride in 25 parts of ethylene dichloride. A further 38 parts of ethylene dichloride is then added and the yellow brown solution so obtained is slowly added to a solution of 10 parts of naphthalene in 50 parts of ethylene dichloride. The mixture is heated to 50° C. to complete the reaction. It is then poured into dilute hydrochloric acid, and the product is separated and washed first with water and then with caustic soda and finally distilled. 99 parts of 1-(β-naphthoyl)-naphthalene B. P. 300° C./15 mm., M. P. 135° C. are obtained.

Example 5

9 parts of β-naphthoyl chloride are dissolved in 25 parts of ethylene dichloride and the solution is added to a well stirred suspension of 7 parts aluminium chloride in 25 parts ethylene dichloride. 7 parts of α-methylnaphthalene are added to the stirred mixture. The temperature rises to about 40° C. and the mixture is then stirred until no more hydrogen chloride is evolved. The mixture is poured into water and the oily layer separated. The ethylene chloride is distilled off and the product is crsytallised from glacial acetic acid. 9.5 parts of 4-(β-naphthoyl)-1-methylnaphthalene are obtained.

I claim:
1. In the manufacture of 1-naphthyl methyl ketone in high yield, the process which comprises reacting a Friedel-Craft catalyst with an acylating agent, selected from a class consisting of acetyl chloride and acetic anhydride, in order to form a complex compound, then mixing and reacting said complex compound with naphthalene and with an organic solvent, selected from a class consisting of the chloro- and bromo-paraffins having a specific inductive capacity at 20° C. of from about 5 to 12, and recovering the resulting 1-naphthyl methyl ketone from the reaction products.

2. In the manufacture of 1-naphthyl methyl ketone in high yield, the process which comprises producing a complex compound by reacting in a solvent of ethylene dichloride a Friedel-Craft catalyst, with an acylating reagent, selected from a class consisting of acetyl chloride and acetic anhydride, then heating and reacting said complex compound with naphthalene in admixture in a solvent of ethylene dichloride, and recovering the resulting 1-naphthyl methyl ketone from the reaction products.

GEORGE BADDELEY.

REFERENCES CITED

The following references are of record in the file of this patent:

UNITED STATES PATENTS

| Number | Name | Date |
|---|---|---|
| 2,004,069 | Bruson et al. | June 4, 1935 |
| 2,197,710 | Ralston | Apr. 16, 1940 |

OTHER REFERENCES

C. A. Thomas, "Anhydrous Aluminum Chloride in Organic Chemistry," copyright 1941 by Reinhold Publishing Corp., 330 W. 42nd Street, New York, pages 271–277.

Perrier Berichte, vol. 33, pages 815–816 (1900).